(No Model.) 9 Sheets—Sheet 1.
S. A. CALMAR & H. W. CARR.
MACHINE FOR LABELING SPOOLS.

No. 291,291. Patented Jan. 1, 1884.

(No Model.) 9 Sheets—Sheet 2.

S. A. CALMAR & H. W. CARR.
MACHINE FOR LABELING SPOOLS.

No. 291,291. Patented Jan. 1, 1884.

Fig. 2.
Front end elevation.

Witnesses

Inventors:
Soren A. Calmar
Henry W. Carr
by Chas. M. Higgins
Atty (No Model.) 9 Sheets—Sheet 4.
S. A. CALMAR & H. W. CARR.
MACHINE FOR LABELING SPOOLS.

No. 291,291. Patented Jan. 1, 1884.

Fig 4.
Section on x x.

Witnesses.
Jno. E. Gavin
Charles Fox

Inventor.
Loren A. Calmar
Henry W. Carr
by Chas. M. Higgins
Atty

(No Model.) 9 Sheets—Sheet 7.

S. A. CALMAR & H. W. CARR.
MACHINE FOR LABELING SPOOLS.

No. 291,291. Patented Jan. 1, 1884.

Witnesses

Inventors:
Soren A. Calmar
Henry W. Carr
by Chas. M. Higgins
Atty

(No Model.) 9 Sheets—Sheet 8.

S. A. CALMAR & H. W. CARR.
MACHINE FOR LABELING SPOOLS.

No. 291,291. Patented Jan. 1, 1884.

Witnesses

Inventors:
Loren A. Calmar
Henry W. Carr
by Chas. M. Higgins

(No Model.)

S. A. CALMAR & H. W. CARR.

MACHINE FOR LABELING SPOOLS.

No. 291,291. Patented Jan. 1, 1884.

Witnesses:
Henry F. Parker.
Jno. E. Gavin

Inventors:
Loren A. Calmar
Henry W. Carr
by Chas. M. Higgins
Attorney.

UNITED STATES PATENT OFFICE.

SÖREN A. CALMAR AND HENRY W. CARR, OF ARLINGTON, NEW JERSEY.

MACHINE FOR LABELING SPOOLS.

SPECIFICATION forming part of Letters Patent No. 291,291, dated January 1, 1884.

Application filed December 1, 1882. (No model.)

*To all whom it may concern:*

Be it known that we, SÖREN A. CALMAR and HENRY W. CARR, both of Arlington, Hudson county, New Jersey, have jointly invented a new Machine for Labeling Spools, of which the following is a specification.

The work which this machine is designed to accomplish is to affix labels upon both heads of spools of thread, thence arrange the spools into two parallel columns of six each, and finally deposit or pack two of such columns, forming a dozen, into boxes ready for the market.

To these ends the invention embodies a number of novel features, forming a complete automatic machine for performing the aforesaid operations continuously; and having above indicated the results which the machine effects, we shall avoid any analysis of the mechanism here, but will proceed at once to the general specification, where the novel features are made apparent, and distinctly formulated in the claims.

In the drawings annexed.

Figure 1:
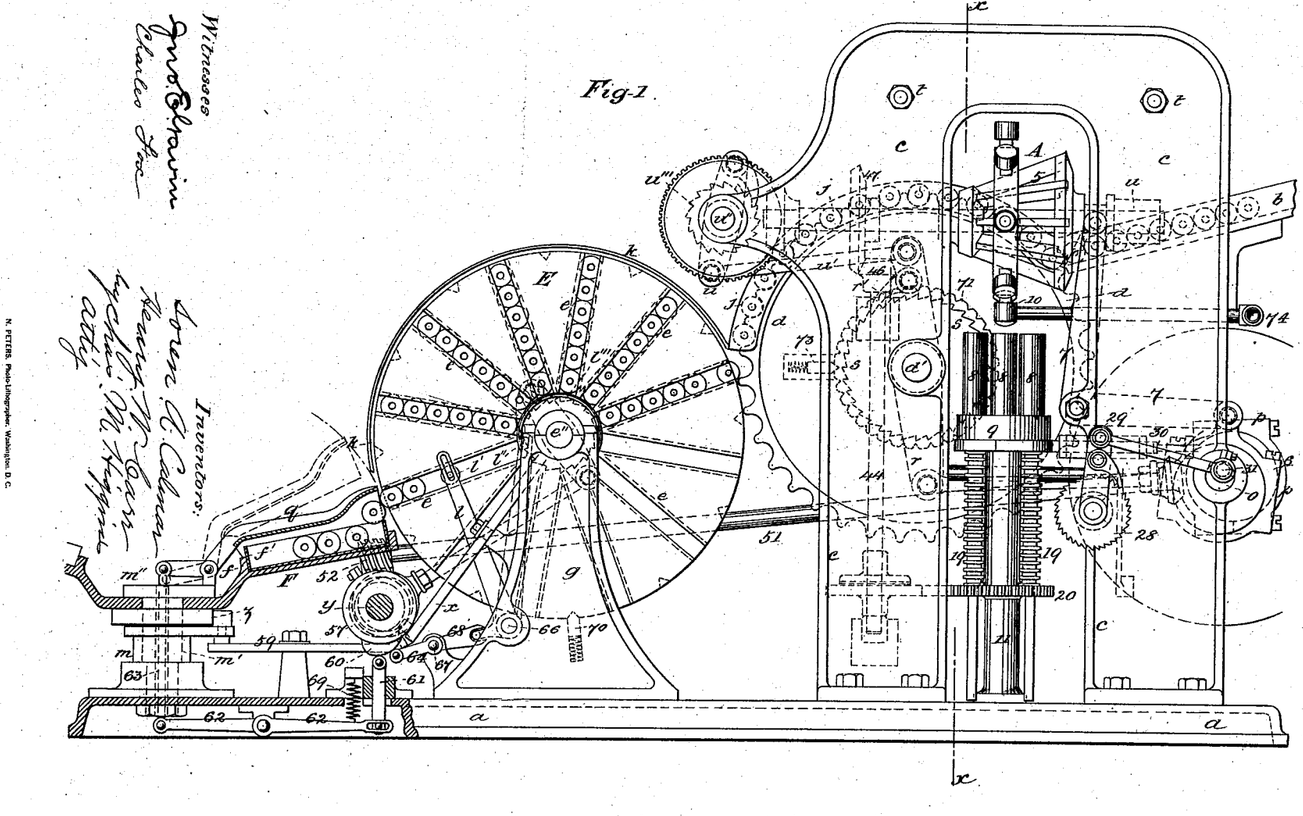
Figure 1 presents a side elevation of the complete machine, partly in section at the packing end.

Referring first to Fig. 1, it may be remarked that the machine is composed of two distinct portions, which may be termed the "labeling" and the "packing" portions, both mounted on the same base $a$, and operatively connected, so as to act in unison and in relation with each other. The labeling portion is shown at the right of the base, and performs the operations of advancing the spools one by one between stamping devices, which successively pick up labels, moisten them, and stick them onto the heads of the spools. The packing portion is shown at the left end of the base, and receives the labeled spools and arranges them in groups of dozens and deposits these dozens successively in boxes, ready to be sealed up for the market.

Figure 2:
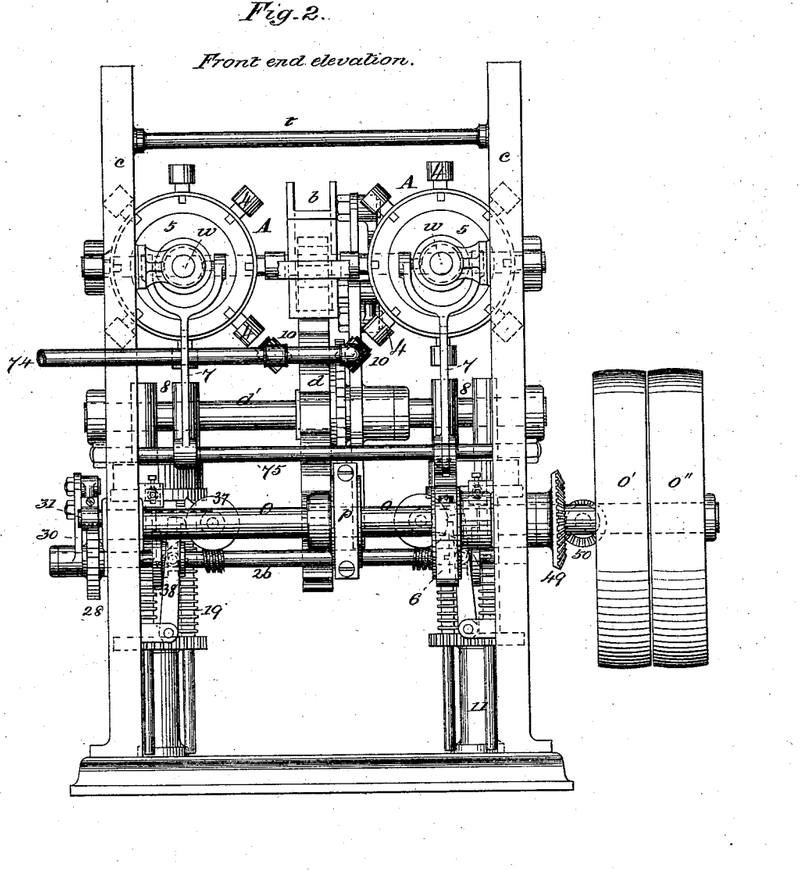
Fig. 2 is a front end elevation of the machine.
Figure 3:
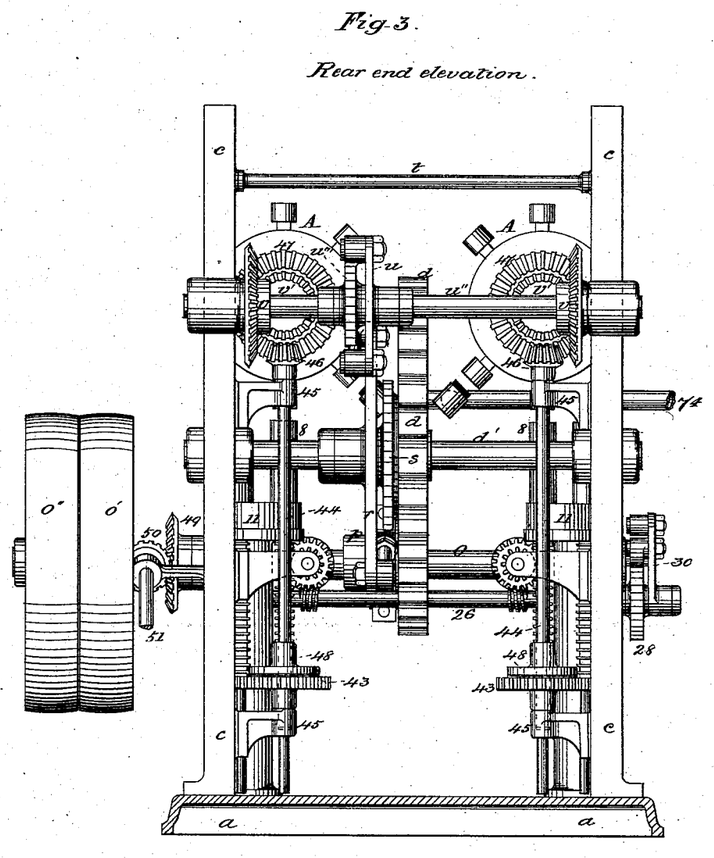
Fig. 3 is a rear end elevation of the machine, or rather of the labeling portion of the machine, the packing portion being removed.
Figure 5:
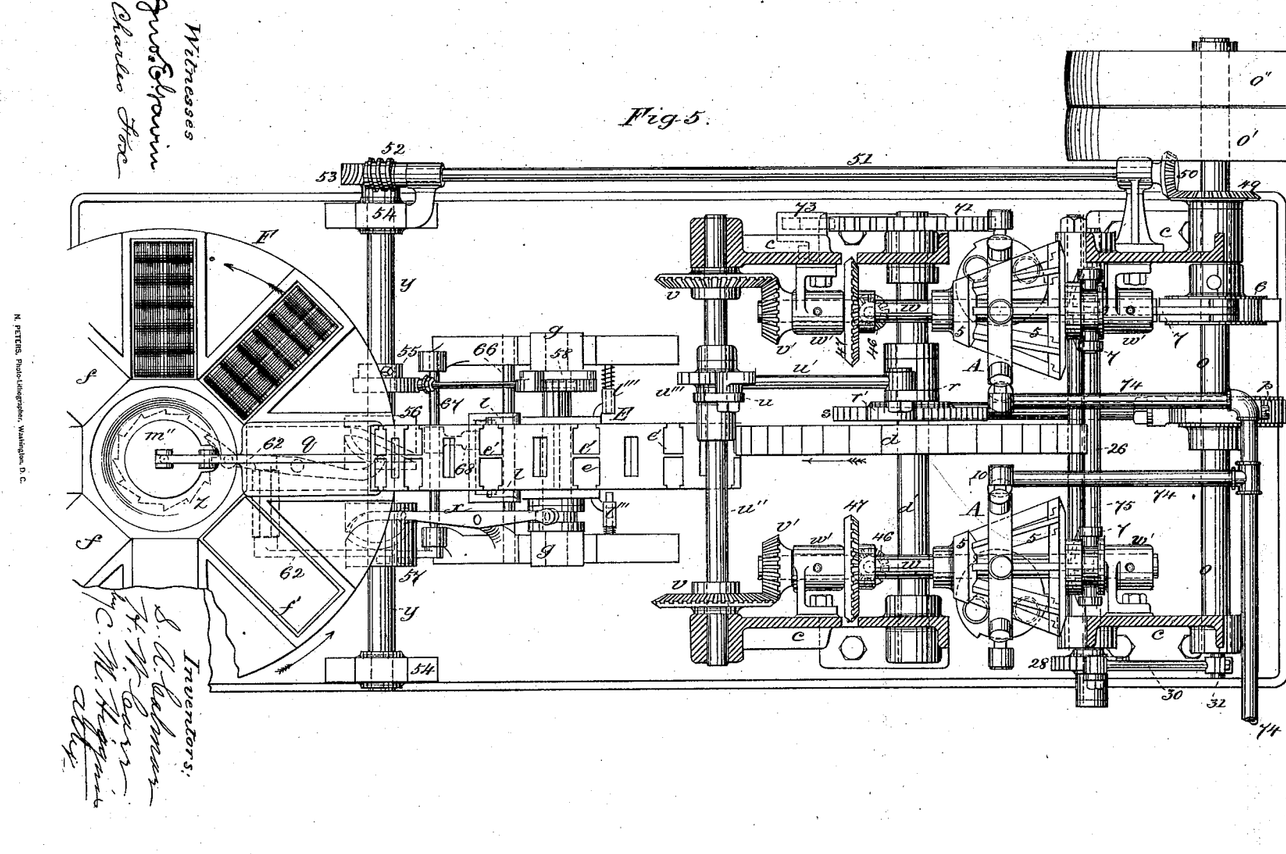
Fig. 5 is a plan view of the complete machine partly in section.

Referring now to Figs. 1 and 2, we will first give a general or outline description of the construction and operation of the entire machine, in order to impart a general idea thereof, and will afterward amplify the details. The spools, with the thread properly wound thereon, are fed in horizontal position into the machine in a single file on the inclined chute $b$ on the front of the machine. The spools roll down this incline against the periphery of an advancing or feed wheel, $d$, which revolves with an intermittent or step-by-step motion upward and away from the chute, as indicated in Fig. 1. This feed-wheel is mounted in about the middle of the machine on the shaft $d'$, which is journaled at each end in bearings in the side frames, $c\ c$, as best shown in Figs. 1, 2, 3, and 5. The periphery of the wheel is toothed or fluted with semicircular flutes, corresponding to the size of the spools, and as the wheel revolves step by step, corresponding to each flute, the successive flutes engage successive spools from the ends of the chute and convey them between two label-stampers, A A, working on each side of the feed-wheel, in conjunction with the exposed ends or heads of the spools. These stampers act, as will be hereinafter shown, so as to successively pick up the labels from a label-container, moisten them, and then stamp or stick them on the heads of the spool during the pause in the step-by-step motion of the feed-wheel. The continued motion of the feed-wheel carries the labeled spools around on its periphery to the descending side of the wheel, from which they are finally delivered into inclined or radial chutes e, in the arranging-drum E, which approaches the feed-wheel at its point of delivery, as shown in Fig. 1. The periphery of the drum, as shown in Fig. 5, is twice the width of the periphery of the feed-wheel, and the receiving-chutes e of the drum are divided by a thin central partition, e', into two channels, each adapted to receive six spools. The feed-drum is mounted on the shaft e'', which is journaled on the standards g, which rise from the base a, the drum being keyed to the shaft, but capable of sliding a limited extent to and fro upon the shaft, so as to bring either side or channel of its feed-chutes into register with the delivering-point of the feed-wheel, as shown in Fig. 5. The drum remains in the position shown in Fig. 5 until it has received six of the labeled spools in one side of its chute, and is then shifted sidewise, so as to bring the other side of the chute into position to receive the other six spools. The drum then revolves a sufficient distance to bring the next chute into register with the delivery-point of the feed-wheel to receive the next dozen of spools in the same manner. The drum E thus revolves with a step-by-step motion, the steps corresponding to the delivery of twelve spools from the feed-wheel, so that the feed-wheel revolves twelve steps to one step of the drum. The drum E, as indicated in Fig. 1, revolves upward and away from the delivery-point of the feed-wheel, and on the descending side of the drum and at its point of delivery is arranged a rotary table, F, on which the successive dozens of spools are delivered from the successive chutes of the drum. This table is flaring or conical on the top, and on its flaring sides are formed a number of radial panels or recesses, f, of oblong or rectangular shape, in which the paper boxes f', to receive the dozens of spools, are placed, as shown well in Figs. 1 and 5. A shield, j, embraces the fluted periphery of the spool-wheel d from the feed-chute b to the point where the wheel delivers into the drum E, as shown best in Fig. 1, this shield being perforated, in conjunction with the stampers A, so as to expose the heads of each successive spool at that point to receive the labels from the stampers, as will be understood from Fig. 1. A shield, k, also extends around the periphery of the drum F from the delivery-point of the feed-wheel to the delivery-point of the drum E, over the edge of the table F, as well shown in Fig. 1; hence, when any chute of the drum passes beyond the end of the shield k and over the edge of paper box in the panel of the table F, the dozen spools contained in this chute will at once roll out of the chute and into the paper box f', placed there to receive them, as seen in Fig. 1.

Figure 14:
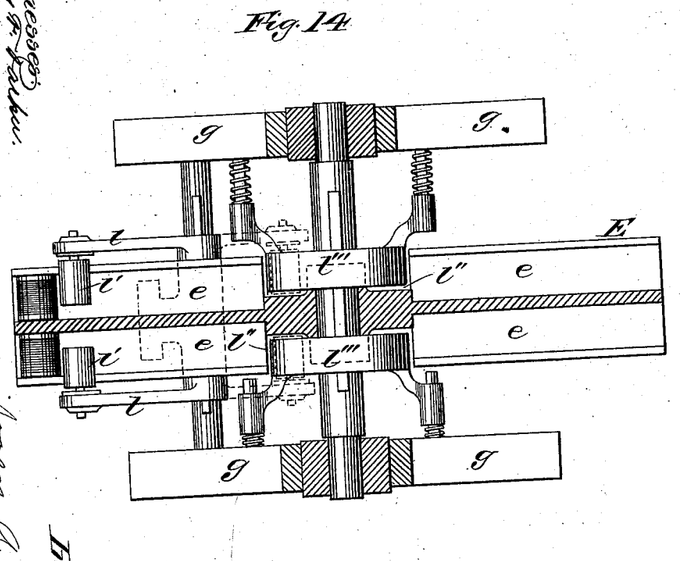
Fig. 14 is an enlarged detail or plan of the arranging-drum and its adjustments shown on the left end of Figs. 1 and 5.

To render the removal of the spools from the drum into the box certain, a lever-arm, l l, on each side of the drum is moved at the proper time, so as to sweep the spools out of the chute in the drum, as will be understood from Figs. 1, 5, and 14. These levers are slotted at the upper end to engage the axes of short rollers l', which project into the chute of the drum, as seen in Fig. 1. When the levers retire after their sweeping motion, they move backward toward the center of the drum into a nearly vertical position, as indicated by dotted lines, where they bring the rollers l' into a circular groove or recess, l'', around the center of the drum from which the chutes e radiate, so that in this position of the rollers and levers the drum is free to revolve in its step-by-step movement to bring each successive chute into its delivery position. Small shields l''' fit into the outer circumference of this groove l'', and close the bottoms of all the chutes e e which are over them, so as to prevent the spools therein from falling into the said grooves. These shields are fixed on the bearings of the drum-shaft, as seen best in Figs. 5 and 14, so that they are of course stationary while the drum revolves around them, and it will be observed by reference to Fig. 1, that the shields terminate just on about a level with the center of the drum in conjunction with the position of the delivery-chute, as illustrated, thus leaving the sweeping-rollers l' free to move out of the central groove, l'', into this chute to force out the spools into the box, as before described, and shown in Fig. 1.

Figure 15:
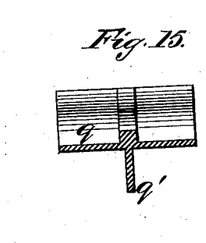
Fig. 15 is a cross-section of the detail shown in Figs. 1 and 5.

As shown in Figs. 5 and 14, the shields e''' are provided with projecting guide-tubes or sleeves which are mounted upon pins projecting from the bearing-frame g g, and are free to slide in or out thereon, but are constantly pressed into the central grooves, l'', of the drum by springs, as illustrated. The shields are hence sustained in firm position in the grooves of the drum, yet will yield laterally to compress one set of springs when the drum shifts from side to side without displacing the parts, as shown best in Fig. 14, also in Fig. 5. The packing-table F, as shown best in Fig. 1, is mounted on top of a short pillar, m, which rises from the base a, and through the center of this pillar passes a strong tubular stud, m', which is fixed to the pillar and base, as indicated. Now, the table F turns on this stud between the top of the pillar m' and the head m'' of the stud, which latter is of course stationary, and an intermittent step-by-step rotary motion is imparted to the table to bring each panel with its paper box into successive coincidence with the delivery-point of the drum E to receive the successive dozens of spools therefrom, as will be understood, each rotary step of the table occuring simultaneously with each rotary step of the drum E, so that a fresh box on the table is brought into coincidence with the drum at the time that the delivery-chute of the drum with its dozen spools arrives in coincidence therewith. As each fresh box is brought into coincidence with the drum, a hinged flap or lid, q, pivoted on the head m'' of the fixed axial stud m' is moved down over the box, as seen in Fig. 1, so as to cover the same and insure the more accurate entrance and deposit of the spools in the box. This lid, a cross-section of which is shown in Fig. 15, is flared or trumpet-shaped at its front end, (see Fig. 1,) to insure the guiding of the spools from the chutes of the drum into the box, and from its under side projects a thin web or partition, $q'$, (see Fig. 15,) coincident with the partition $e$ of the drum-chute, which, extending down into the box insures each half-dozen of spools rolling accurately into their own side of the box. The lid $q$ is of course raised, as indicated by dotted lines in Fig. 1, after each box is filled and before the table moves the next step to bring the next box in position, after which the lid is again depressed as will be understood. As fast as full boxes pass out from under the lid $q$, they are removed from the table, and empty boxes put in their place and the operation thus continued. The specific actuating mechanism for producing all the several described movements of the packing mechanism will be hereinafter detailed, and as a general outline of the action of the complete machine has now been given, we may now return to the consideration of the labeling portion of the machine.

Referring again to Figs. 1 and 2, it will be seen that the side frames, $c\ c$, are braced together at the top by the tie-rods $t\ t$, and on the front edges of the frames bearings are formed in which the main or driving shaft $o$ of the machine is mounted. One end of this shaft projects beyond the frame and receives the fast and loose pulleys $o'\ o''$, as shown best in Figs. 2 and 5, on which the driving-belt is applied in the ordinary manner to impart motion to the machine. At or near the middle of the driving-shaft is keyed an eccentric, $p$, whose rod connects to one arm of a pawl-lever, $r$, which is hung loosely on the shaft $d'$ of the spool-wheel $d$ close up to a ratchet-wheel, $s$, which is keyed to said shaft, and which ratchet-wheel is engaged by the pawl $r'$, which is pivoted on the upper arm of the lever, as shown in Figs. 1, 2, and 5. The teeth of the ratchet-wheel $s$ correspond in number to the flutes of the spool-wheel, and it will therefore be seen that each revolution of the driving-shaft $o$ will reciprocate the pawl-lever once and advance the ratchet and spool-wheel the space of one spool. Now, the upper arm of the pawl-lever $r$ is connected by the pitman $u'$ with a second pawl-lever, $u$, which turns freely on the shaft $u''$, and whose pawl engages a ratchet-wheel, $u'''$, keyed to said shaft, as shown best in Figs. 1, 3, and 5. This shaft $u''$ is journaled at each end in bearings formed on the wings or lugs, which project from the back edges of the side frames, $c\ c$, and on the ends of the shaft, near each bearing, are keyed the bevel-gear wheels $v\ v$, which mesh with bevel-pinions $v'$, fixed on the ends of the shafts $w\ w$, on which the label-stampers A A are mounted. These stamper-shafts $w$, as shown best in Figs. 5, 2, and 4, extend at right angles to the other shafts named, along each side of the machine, close to the side frames, being mounted in bearing-lugs $w'$, which are affixed to and project from the inside of the side frames. Now, the ratchet $u'''$ of the connecting-shaft $u''$ has the same number of teeth as the ratchet $s$ of the spool-wheel $d$, so that, consequently, by means of the connected mechanism shown, both pawl-levers $r\ u$ will be reciprocated simultaneously by the eccentric $p$ on the driving-shaft $o$, and as the spool-wheel is thus rotated step by step the label-stampers A A will also rotate step by step on each side of the spool-wheel, (see Figs. 5, 2, 3, and 4,) the steps and pauses of spool-wheel and stamper being therefore coincident and simultaneous.

Figure 4:
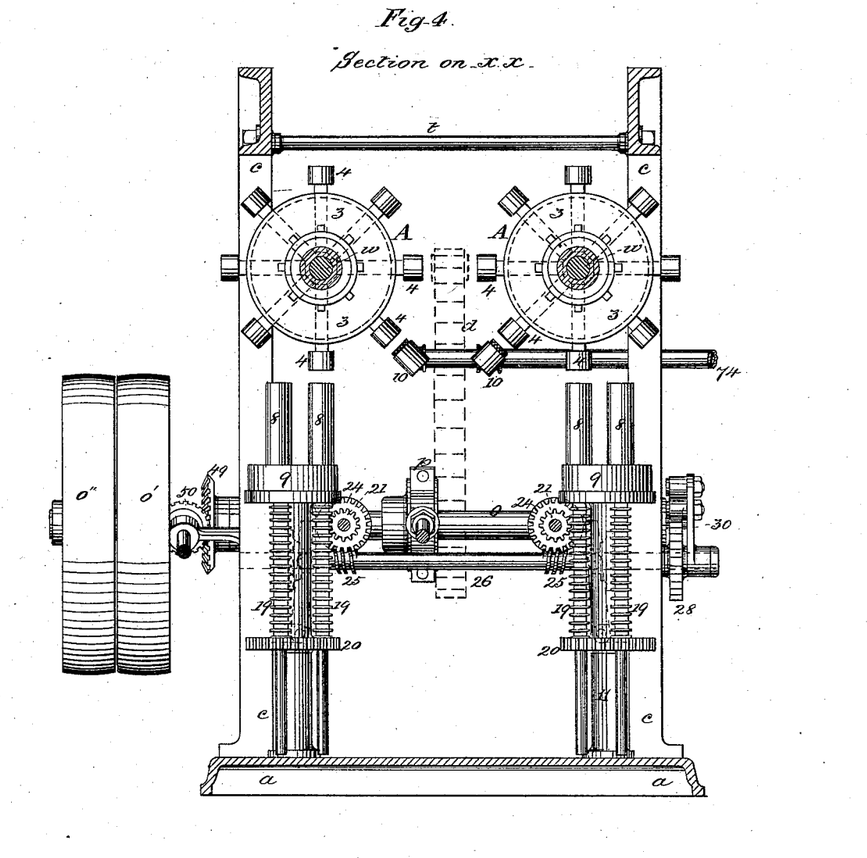
Fig. 4 is a cross-sectional elevation through the middle of the labeling portion of the machine on line $x\ x$ of Fig. 1, looking to the right.
Figure 11:
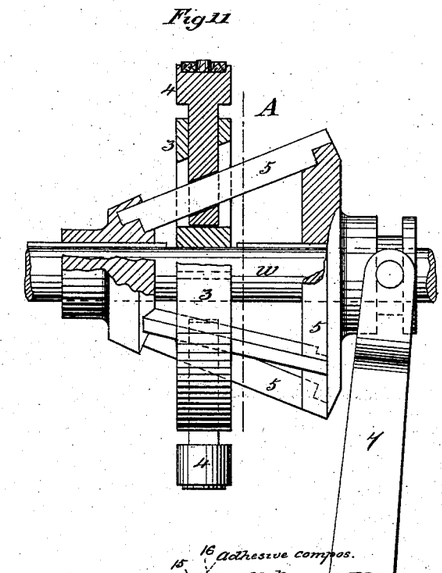
Figs. 11, 12, and 13 show different views of the label-stamping devices.
Figure 12:
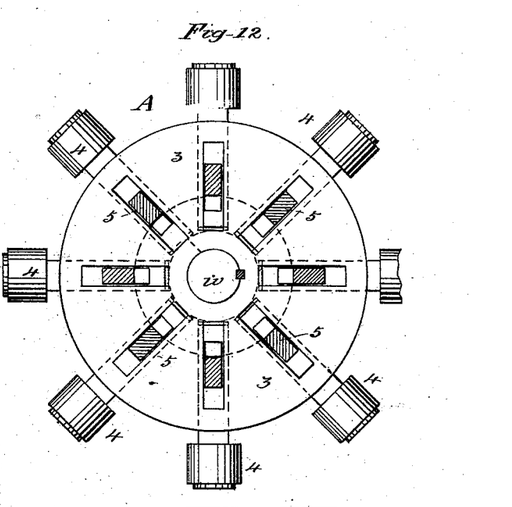
Figure 13:
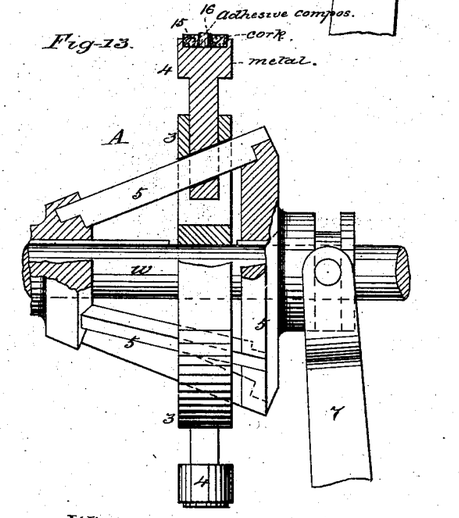

We will now consider the special construction of the stampers A A, for which we may refer, first, to the general views in Figs. 2 and 4, and thence to the enlarged details thereof in Figs. 11, 12, and 13. As shown best in the latter figures, a prominent part of the stamper is the disk 3, which is keyed to and of course revolves with the stamper-shaft $w$. This disk is provided with a series of little platens or stamper-heads, 4 4, projecting radially from its periphery, preferably eight in number. The stems of these platens are round or square and slide in radial ways or sockets in the disk, as shown. On the stamper-shaft is mounted a cam-cone, 5, formed of two heads connected by spokes or staves, each of which spokes or staves forms a sliding cam, which cone is also keyed to the shaft, so as to revolve with the disk and its platens, but is capable of sliding back and forth on its key, and the spokes of the cone correspond in number to the platens and pass through and engage with slots in the stems of the platens, as illustrated; hence, when the cone is slid in one direction, the platens will be projected outward from the disk, as shown in Fig. 13, and when slid in the other direction the platens will be converged or retracted inward, as seen in Figs. 11 and 12. The cone is thus slid to and fro by the action of a second eccentric, 6, on the main shaft $o$, (see Figs. 1, 2, and 5,) which connects to one arm of an elbow-lever, 7, the opposite arm of which is forked to straddle and engage with the grooved collar on the end of the cone, which is well shown in Figs. 1 and 5 and partly in Figs. 11 and 13.

Figure 10:
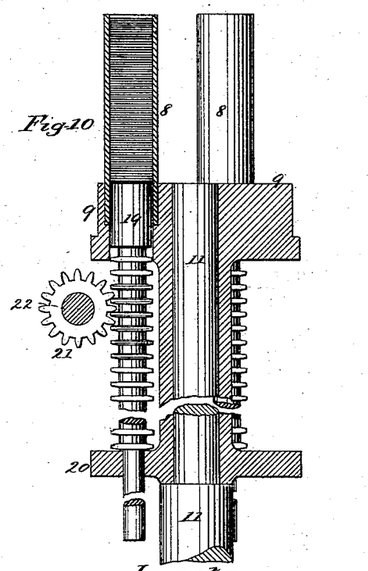
Fig. 10 is an enlarged sectional elevation of the label containers and feeders.

We will now consider how the labels are presented to the stampers. The labels are of course first cut to the proper size and form, with one side gummed, and when the gum is dry they should be pressed flat and smooth, so that a stack or column will lie in smooth, close, and level layers without adhering to each other. A column of the labels in this condition, with the printed side up, is then placed in the label-containers 8 8, which are shown best in Figs. 1, 4, and 10, and consist of tubes or little turrets 8 8, fixed in a group of three on top of a little rotary table, 9, which is arranged under the stampers A A, and capable of being turned so that each turret, when filled with labels, may be brought successively under the stampers, and as soon as the labels are exhausted from one it will be turned out to receive a fresh supply, while the next full one takes its place, as will be understood. Referring first to Fig. 10, which shows the charged turret in section with its stack of labels placed in coincident position under the stamper and ready for action, we may now turn to Fig. 4, where the position of the spool-wheel and the spool to receive the labels is indicated by dotted lines between the two stampers A A. From this view it will be seen that three of the pickers or platens, 4, of the stampers will be in action at the same time, each having a different operation or stage of the process to perform at the same time. Thus the platen at the bottom of the stamper-disk will be in coincidence with the label-holders 8, ready to descend into the same to pick up a label, the platen at the middle of the disk will be in coincidence with the spool-head, while the intermediate platen will be in coincidence with a moistening-pad, 10. Now, we have seen that the steps in the rotation of the stampers occur coincident with the steps in the rotation of the spool-wheel, so that the unlabeled spools are brought successively into coincidence with the stampers when the pause in the movement of both occurs to allow the stampers to stick the labels on the spool-heads; hence in the position shown in Fig. 4 both stampers and spool-wheel are at their pause in the rotation, and at this moment the eccentric 6 comes into action to slide the cones 5 5 backward and thus diverge the stampers. The first or lowermost stamper will at this motion descend into the label-container and adhere to a label, while the second one will press the label previously picked up against the moistening-pads 10, while the third stamper will press the previously-moistened label upon the spool-heads, to which they will strongly adhere. Immediately after this stamping and diverging action of the stampers the cones will be slid in the opposite direction, and the stampers thereby converged or retracted, thus withdrawing the label-sticking platens from the spool-heads and leaving the labels cemented thereon, also withdrawing the moistening-platens from the pads 10, with their moistened labels still adhering and ready to be applied to the next spool, while the picking-platens will rise out of the label-holders with a label adhering thereto. This retracting motion of the platens occurs simultaneously with the next forward step in the rotation of the stamper-disks and spool-wheel, as will be understood, after which the aforesaid operations are repeated in continuous order for every spool advanced. The construction whereby the stampers are enabled to pick up a label out of the containers 8 by being simply pressed against the same and then adhere to and retain the label until it is stuck onto the spool-heads is shown in Figs. 11 and 13, to which we may now refer.

The stamper heads or platens 4 4 are preferably made of metal; but in the faces of each is formed a recess, in which a disk of cork, 15, is firmly embedded, the disk protruding and having a level circular face of about the same size as the label, so as to bear upon the entire surface of the label when forced against the same. In the center of the cork disk is embedded a little cylindrical plug, 16, of an adhesive composition, which protrudes slightly from the surface of the cork, and is of a diameter about equal to the bore in the spools. The composition of which I prefer to make these plugs is composed of common rubber cement, (caoutchouc dissolved in naphtha,) glue dissolved in water, and glycerine or molasses, so proportioned as to form a soft elastic solid having such a property as to adhere tenaciously to the label, yet not smear it or give off any of its substance thereon when the label is afterward detached therefrom. It will therefore be readily seen that when the platen is pressed against the top label the adherent plug 16 will first come into contact with its center and cause it to adhere thereto, thus enabling the platen to pick it up and retain it during subsequent movements until finally the moistened label is stuck onto the spool-head, when its adhesion on the spool-head then becomes much greater than its adhesion to the plug 16, so that at the next retraction of the platen the plug gives up its hold on the label and leaves the label sticking on the spool. When the platen, with its adhering label, is pressed against the spool-head, the cork disk 15 of course exerts a uniform elastic pressure over the entire surface of the label, thus causing it to adhere uniformly over the entire surface of the spool-head, as will be understood. It will be also seen that as one label is pressed simultaneously on opposite heads of the spool there is no tendency to displace the spool on the spool-wheel in the act of labeling.

We will now consider how the labels are fed or supplied to the stampers as fast as required thereby.

Figure 6:
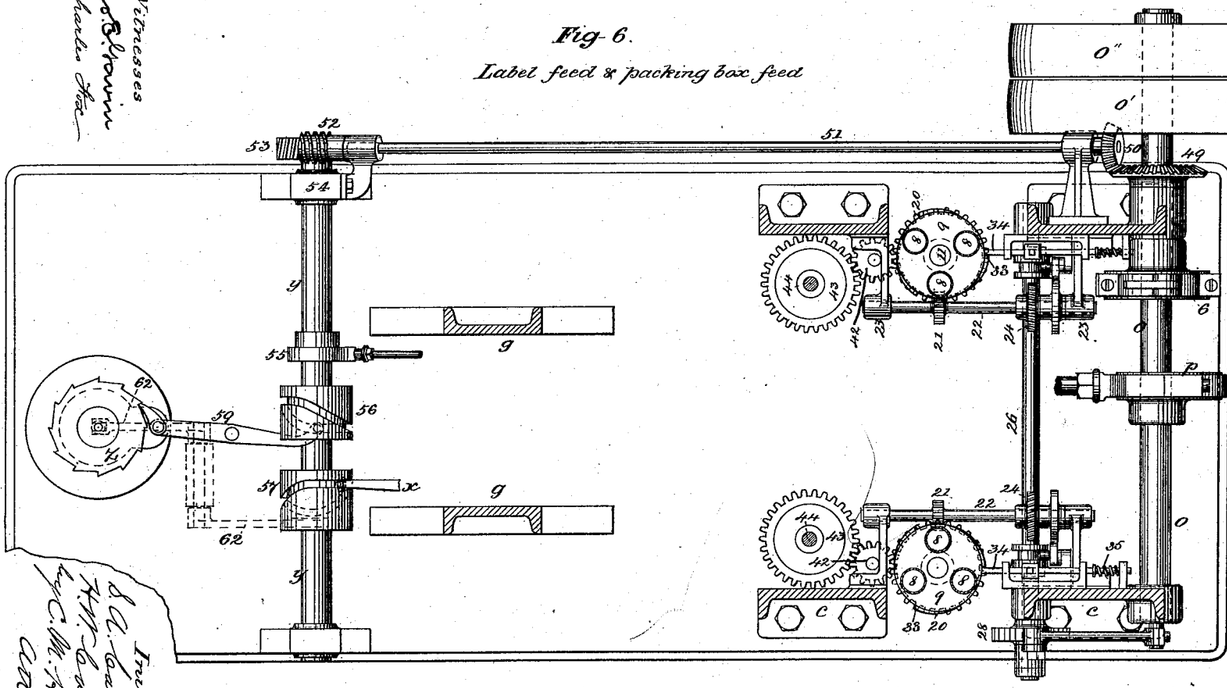
Fig. 6 is a plan view of the lower parts of the complete machine, showing more particularly the label-feed and the packing-feed mechanism, all the upper parts of the machine being removed.
Figure 7:
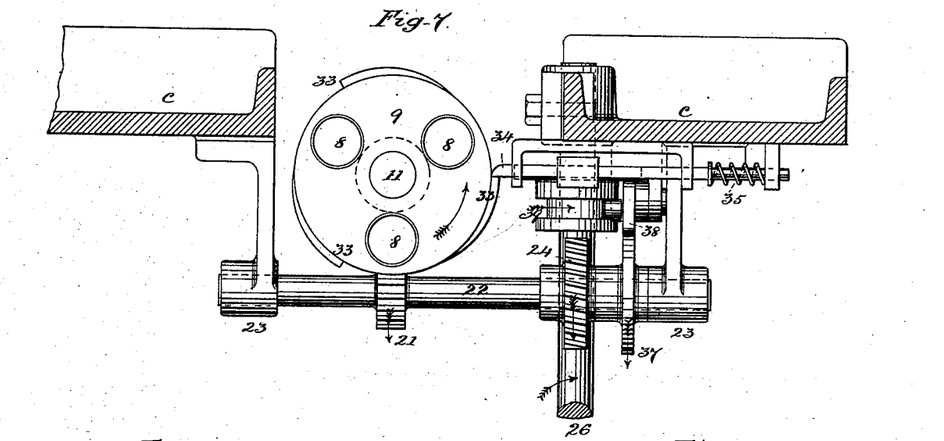
Fig. 7 is an enlarged fragmentary plan of portions of the label-feed.
Figure 8:
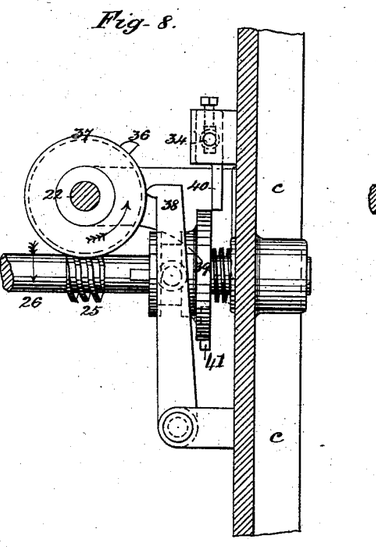
Fig. 8 is an end elevation of said portion, and Fig. 9 a side elevation of the same.
Figure 9:
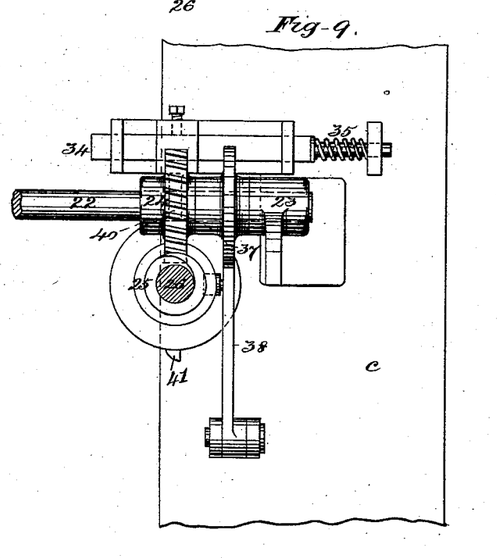

Referring to Figs. 1, 4, and 10, it will be seen that the rotary table 9, in which the label turrets or tubes are fixed, is mounted on a shouldered post, 11, which rises from the base $a$ at the opening in the side frames, as seen best in Figs. 1 and 4, and is free to turn on said post. Each turret is fitted with a piston, 19, as best shown in Fig. 10, on which the column of labels rests, and by which the labels are fed up to the stamper as fast as required in fine intermittent steps corresponding to the thickness of the labels. The rod of each of these pistons is turned with cylindrical or annular gear-teeth, forming a cylindrical rack, and the lower end of each rod is guided through holes in the base-flange 20 of the rotary table. When the table is turned, so as to bring any one turret in active position under the stamper, as seen in Fig. 10, the rack-teeth on the piston of that turret will engage with a feed-pinion, 21, arranged in the path of rotation of said racks, and as the racks are cylindrical they are sure to engage with the said pinion, no matter what side of the racks happens to be presented to the pinion when the table is turned, as will be understood. Now, the feed-pinion 21 is fixed on a little horizontal shaft, 22, as seen best in Figs. 6 and 7, which is journaled at each end in bearing-lugs 23, projecting from the side frames. On this pinion-shaft 22 is fixed a worm-wheel, 24, which meshes with a worm, 25, on a transverse shaft, 26, (see Figs. 4 and 6,) which shaft extends across the machine below and behind the main shaft $o$, and is journaled in bearings on the side frame. On the end of this shaft 26, outside the frame, (see Figs. 1, 4, and 6,) is fixed a ratchet-wheel, 28, and on the shaft is loosely mounted a pawl-lever, 29, whose pawl engages said ratchet, while the lever is connected by the pitman 30 with a crank, 31, of very short throw on the end of the driving-shaft $o$. Hence, by this gearing, each revolution of the main shaft, which represents the advance of one spool, will move the ratchet-wheel 28 one tooth, and this movement being transmitted through the worm-gearing 24 25 to the label-feeding pinion 21, will raise the label-feeding piston just the thickness of one label, or thereabout, as will be understood, so as to keep the labels fed up to the top of the tube as fast as they are picked out by the stampers. Now, the feeding-pistons in the two turrets, which are turned out of action, as seen best in Fig. 1, will of course fall down to the bottom of the turrets by their own weight, leaving the turrets free to receive a fresh charge of labels, ready to be turned into position as soon as the one in action becomes exhausted. The turrets are therefore turned into position, as follows: Referring to Figs. 6 and 7, it may be noted that the periphery of the turret-table is provided with three escapement teeth or stops, 33, corresponding to the three turrets, one of which teeth will be engaged with the point of a spring-bolt, 34, so as to hold one of the turrets in correct position under the stampers. The turret-table has a constant tendency to turn in the direction of the arrow, as shown in Fig. 7, so as to remain in the fixed position, (shown so long as the spring-bolt engages the stop-tooth,) which it constantly tends to do by the pressure of its spring 35. Now, when the feed-pinion 21 and its shaft 22 have made one revolution, the feed-piston will have been raised to its full extent in the label-turret, and all or nearly all the labels will be hence fed out of the same, and at the end of this revolution an inclined cam-tooth, 36, on a cam-disk, 37, which revolves with said shaft, will engage a lever, 38, and press it outward. This lever is engaged with a sliding collar, 39, which slides on a key on the worm-shaft 26, and of course revolves with said shaft, its revolution being rapid compared with the revolution of the feed-shaft 22, as will be understood. When the lever 38 is slid outward, as described, the rotating collar 39 will of course be slid with it, and its periphery will be moved under a projection, 40, on the spring-bolt 34, and a cam-tooth, 41, on said periphery will engage said projection at a certain point in the revolution, and thus withdraw the bolt from its engagement with the escapement-tooth on the turret-table 9, (see Fig. 7,) thus permitting that tooth to escape and allowing the turret to revolve; but immediately after this the spring-bolt is again released as soon as the cam 36 passes beyond it, and then flies out in time to catch the next escapement-tooth, which movement, of course, brings a fresh turret with a full charge of labels under the stampers. Before the collar 39 can make another revolution the cam-tooth 36 on the disk 37 will have advanced beyond the shifting-lever 38, thus allowing the lever 38 and collar 39 to move into their quiescent position, as shown in Fig. 8, out of range of the spring-bolt 34 and 40, as will be understood from Fig. 8, so that the collar 39 may continue to revolve without affecting the spring-bolt until the cam-disk 37 has made another revolution, when the same operations will be again repeated.

The means for imparting a constant rotating tendency to the turret-table 9 is provided by friction-gearing driven from the mechanism of the machine and gearing with the table— that is, by reference to Figs. 1, 4, 6, and 10 it will be noted that the base flange 20 of the table is toothed on its peripery to form a spur-gear wheel which meshes with a pinion, 42, which in turn meshes with a gear-wheel, 43. This gear-wheel is mounted on a vertical shaft, 44, which is journaled at each end in the brackets 45, projecting from the side frame, and on its upper end is fixed a bevel-pinion, 46, which meshes with a bevel-wheel, 47, on the stamper-shaft $w$. The shaft 44 passes loosely through the spur-wheel 43 whose hub rests on the lower bearing-bracket 45, (see Fig. 3,) while above the wheel 43 a friction-disk, 48, is fixed on the shaft and bears upon the wheel 43, the meeting-surfaces of the two being preferably faced with leather. Hence each intermittent step in the rotation of the stamper-shafts will be imparted to the friction-disks 48, which will constantly tend to turn the gearing 43 42 20, and thus rotate the turret-table, which tendency will become effective as soon as the bolt 35 is released, as before described.

We have now described all the mechanism of the labeling portion of the machine, and also the action and general construction of the packing portion of the machine, and it now remains to describe the specific actuating devices which produce the several described motions of the packing mechanism as well as the operative connection between the two parts of the machine.

Referring first to Figs. 1, 5, and 6, it will be seen that on the main shaft $o$ of the machine, near the driving-pulleys, is fixed a bevel gear-wheel, 49, which meshes with a pinion, 50, on one end of a long shaft, 51, which extends along one side of the machine at a slight inclination backward, and is provided on its opposite end with a worm, 52, which meshes with a worm-wheel, 53, on the end of a transverse cam-shaft, $y$, which is the main shaft of the packing mechanism from which all its movements are produced. This shaft is journaled on short standards 54, which rise from each side of the base, and on it are mounted one eccentric, 55, and two cylindrical grooved cams, 56 and 57. The rod of the eccentric 55 connects to a pawl-lever on the shaft of the drum E, whose pawl engages a ratchet-wheel, 58, keyed to said driving-shaft. The groove in the cam 56 has but one change and engages a pawl-lever, 59, which is pivoted on a post rising from the base, and its pawl engages a ratchet, $z$, on the under side of the packing-table F. The groove in the other cam, 57, has two changes and engages the inclined lever $x$, which shifts the drum to and fro on the shaft, as before described, this lever being pivoted on one of the standards $g$ of the drum and engaging with a groove in the hub of the drum, as shown best in Figs. 1 and 5. On the periphery of the shifting-cam 57 is an inclined tooth-cam, 60, (see Fig. 1,) which at a certain point of the revolution depresses a sliding-bar, 61, in the base and thus sways levers 62, connected therewith. These levers are connected to a rod, 63, which rises through the hollow stud $m'$ on which the packing-table turns, and thence connects to the hinged lid or flap $q$, so as to swing said lid down over the box, as shown in Fig. 1, when the dozen spools are about to be rolled into the same. Immediately after the lid is thus depressed the cam-tooth 60 engages the lever 64, which connects with the sweeping-levers $l\ l$, and thus sways those levers downward so as to sweep the spools out of the delivery-chute of the drum into the box on the packing-table, as before described, and shown in Fig. 1.

It may be noted by reference to Figs. 1, 5, and 14, that the sweeping-levers $l\ l$ are yoked together, and are mounted loosely on the bar 66, and they are free to shift or slide on said bar with the shifting of the drum, while the cam-lever 64 is fixed onto one end of a rock-shaft, 67, from which a second lever-arm, 68, projects and is forked on the end to engage the yoking-bar of the sweeping-levers $l\ l$, as fully shown in Figs. 1 and 5. Now, the main shaft $o$ is geared with the cam-shaft $y$ of the packing mechanism in the proportion of twelve to one, so that the main shaft $o$ makes twelve revolutions to one revolution of the cam-shaft $y$. The number of teeth in the ratchet 58 of the drum-shaft is the same as the number of the spool-chutes therein, and likewise the number of teeth in the ratchet $z$ of the packing-table corresponds with the panels for the boxes therein. It will therefore be seen that by this proportion, while the main shaft $o$ makes twelve revolutions, and thus causes the spool-wheel $d$ to deposit twelve labeled spools in the receiving-chute of the drum E, the cam-shaft $y$ will make one revolution and advance the drum around one step, and also turn the packing-table around one step, and thus deposit these successive dozens of spools in the boxes on the packing-table. The swinging flap $q$ is raised to uncover the spool-box as soon as the spools are deposited therein and after the cam 60 retires from the bar 61 by means of the spring 69, as will be understood.

In order to prevent the spool-wheel $d$ or drum E from getting out of proper register at each step, a retaining device is employed, which is best shown in Fig. 1, and consists, as regards the drum, of a sliding spring-bolt, 70, affixed on the standard $q$, and having a V-point to engage in V-notches in the periphery of the drum corresponding to each step. On the same principle a disk, 71, fixed on the shaft of the spool-wheel, has its periphery indented with V-notches corresponding to the flutes of the wheel, which engage a sliding spring-bolt, 73, affixed on some stationary part of the machine, as seen best in Figs. 1 and 5. It will be readily seen that when the pawls act to move the spool wheel or drum, that the spring-bolts 70 and 73 will spring out of the notches with which they are then engaged and spring into engagement with the next notches, and thus cause the parts to come into true register at the end of each step and hold them securely there until positively moved by the pawls at the next step.

By reference to Figs. 1, 2, 4, and 5, it will be seen that the moistening-pads 10 10 are mounted on tubes 74, through which a moistening-liquid or a liquid cement can be supplied to the moisteners at the rate required by means of a suitable valve in the pipes.

Having now fully specified our invention, it will be understood that the actuating devices for producing the several movements of the machine, on the principles and in the order set forth, might be varied considerably without departing from the essential organization of the machine; and we would here point out several particular modifications which might be adopted without departing from the main features of the invention, viz: the friction-gearing for turning the label-turrets may be entirely dispensed with and a spring arranged to constantly tend to turn the turrets with equivalent effect, this spring being wound up occasionally by the operator.

Instead of the labels being picked up by an adherent composition, pneumatic suction may be employed.

Instead of employing two stampers to stick a label on each head of the spool simultaneously, but one stamper may be used to label one head, a fixed abutment being arranged in conjunction with the other head to resist the thrust. Instead, however, of having the stampers A to stick labels upon the spools, labeling may be entirely dispensed with and the stampers may be formed to directly print a brand thereon, the faces of the platens 44 being engraved or otherwise formed for printing, while for the label-holders 8 and moistening-pads 10 may be substituted an inking mechanism for inking the platens.

It may be also understood that endless bands might be used in place of the wheel $d$ and table F, but not with any advantage.

Instead of packing the spools in dozens arranged in two rows of six each the mechanism may be modified so as to arrange the spools in three rows of four each, or in any other order, as will be understood, the latter arrangement being preferred in the case of large spools.

What we claim as our invention is—

1. In a labeling-machine substantially such as set forth, a rotary stamping device provided with a radial series of stampers, in combination with means for advancing the spools step by step and for revolving the series of stampers in coincident steps, and means, substantially as described, to diverge the series at the pause between the steps and to retract the same at the next step, substantially as herein set forth.

2. In a labeling-machine such as set forth, the combination, with means to advance the spools one by one with intervening pauses, of an intermittent rotary stamping device provided with a radial series of stampers operating in relation with the spools, together with a reservoir of labels and a moistening-pad arranged in relation with two of said stampers, so arranged that three of said stampers act at the same time—one picking up a label, another moistening the previous label, and a third sticking the label previously moistened onto the spool-head—substantially as herein shown and described.

3. In a labeling-machine of the kind set forth, the combination, with an intermittent rotary label-stamping device provided with a radial series of reciprocating plungers or pickers, of a label-holding tube or reservoir arranged in line with said stampers, with a feeding-piston to force the column of labels toward the stampers, and means, substantially as described, for propelling said piston to advance the labels in correspondence with the strokes of the stamper, substantially as herein set forth.

4. In a labeling-machine of the kind set forth, the combination, with a label picking and stamping device, of a series of label-holding tubes or reservoirs mounted on a rotary or movable support arranged to present one of the reservoirs in line with the picker, with a retaining-catch to hold the same in said position, and with means tending to move said support so as to remove one reservoir from under the picker and present another one in its place, and with a tripping device arranged to release said catch and thus cause the change in the position of the reservoirs when the one in action becomes exhausted, substantially as herein shown and described.

5. The combination, in a labeling-machine of the described kind, with an intermittent rotary spool-wheel, $d$, of the intermediate rotary stamper or stampers, A, relatively arranged substantially as shown, with a ratchet feeding device for revolving said wheel step by step, and a distinct ratchet-feed device for revolving said stamper or stampers step by step, and an operative connection between the two feeds and a single reciprocating motive device, substantially as described, actuating one of said ratchet-feeds, whereby both wheel and stampers are moved in coincident steps by the same motive impulses, substantially as herein set forth.

6. In a labeling-machine substantially such as set forth, the label-feeding mechanism, consisting of a label-reservoir, 8, propelling-piston 19, formed as a rack, a pinion engaging therewith and operated through connections, substantially as described, by the worm 25, and a ratchet-feeding device for revolving said gearing step by step and thus moving said piston in steps corresponding to the thickness of the labels, or nearly so, substantially as herein set forth.

7. In a labeling or branding machine, such as set forth, the stamping device A, consisting of an intermittently-rotary disk, 3, provided with a radially sliding series of projecting stampers, 4, with the axially-sliding cone 5, engaged with said stampers, whereby the latter are reciprocated as the cone is slid to and fro, substantially as and for the purpose set forth.

8. In a labeling-machine such as set forth, a label picking and applying device, faced with a solid or semi-solid adherent composition adapted to temporarily adhere to the label without giving off any appreciable amount of its substance thereon when subsequently detached, substantially as herein shown and described.

9. In a spool labeling and packing machine such as described, the combination, with a device for arranging and delivering the spools in regular groups, of the intermittently-movable packing-table F, adapted to hold a series of boxes for receiving said groups successively, with means, substantially as described, for moving said table in steps corresponding to its boxes and coincident with the delivery of each group of spools from the arranging device, substantially as herein shown and described.

10. The combination, in a labeling or branding machine substantially such as set forth, with means, substantially as described, for advancing the labeled spools one after the other, of the receiving and arranging drum E, having a series of radial chutes adapted to receive said spools in regular groups, an intermittently-movable table placed in conjunction with the delivery-point of said drum, and adapted to hold boxes for receiving said groups, and means for rotating said drum and table in steps corresponding to the receipt of each group of spools, and for depositing each group successively in the boxes of said table, substantially as herein set forth.

11. In a labeling and packing machine substantially such as set forth, the combination, with the rotary arranging-drum E, having a series of radial arranging-chutes, of the rotary packing-table F, provided with radial sockets for packing boxes, and revolving in a plane at right angles to the plane of the drum, or nearly so, with feed mechanism for rotating the drum in steps corresponding to its chutes, and a feed mechanism for rotating the table in steps corresponding to its boxes, together with operative connections between the two, whereby a box on the table and a chute in the drum are brought into coincidence at each step, all substantially as described, and for the purpose set forth.

12. In a labeling or branding machine substantially such as set forth, adapted to advance a single line of labeled spools, the arranging-drum E, provided with a radial series of chutes of twice the width of said spools, arranged to receive the labeled spools from the advancing device, with means for revolving said drum in intermittent steps corresponding to its chutes, and means for shifting said drum from side to side during the pause between each step, so as to receive a parallel group or line of spools in each side of its chute, all substantially as described, and for the purpose set forth.

13. In a spool labeling and packing machine such as described, the combination, with a device for arranging and delivering the spools in regular groups, with the packing-table F, adapted to support boxes to receive said groups in succession, and with the swinging lid $q$, arranged to cover said boxes and act to guide the spools therein at the moment of delivery, of means, substantially as described, for operating said lid in relation with the movements of its co-operating parts, as herein shown and described.

14. The combination, with the drum E and table F, formed and arranged relative to each other, substantially as described, of the discharging device $l\,l$, and means for operating the same in relation with the motions of said drum and table, substantially as and for the purpose set forth.

SÖREN A. CALMAR.
HENRY W. CARR.

Witnesses:
JNO. E. GAVIN,
CHAS. M. HIGGINS.